(12) United States Patent
Ireland

(10) Patent No.: US 11,092,137 B2
(45) Date of Patent: Aug. 17, 2021

(54) RECESSED-MAGNET FLYWHEEL CONSTRUCTION FOR VERTICAL AXIS WIND TURBINES

(71) Applicant: Kelso Energy Ltd, Winkler (CA)

(72) Inventor: Barry Ireland, Winkler (CA)

(73) Assignee: Kelso Energy Ltd., Winkler (CA)

( * ) Notice: Subject to any disclaimer, the term of this patent is extended or adjusted under 35 U.S.C. 154(b) by 0 days.

(21) Appl. No.: 15/979,852

(22) Filed: May 15, 2018

(65) Prior Publication Data
US 2021/0033068 A1 Feb. 4, 2021

Related U.S. Application Data

(63) Continuation of application No. PCT/CA2016/051357, filed on Nov. 21, 2016.

(60) Provisional application No. 62/257,823, filed on Nov. 20, 2015.

(51) Int. Cl.
*F03D 9/12* (2016.01)
*F03D 9/25* (2016.01)
*F03D 3/00* (2006.01)

(52) U.S. Cl.
CPC .............. *F03D 9/12* (2016.05); *F03D 3/005* (2013.01); *F03D 9/25* (2016.05); *F05B 2220/705* (2020.08); *F05B 2220/7068* (2013.01); *F05B 2230/23* (2013.01); *F05B 2240/211* (2013.01); *F05B 2250/131* (2013.01); *F05B 2250/71* (2013.01); *F05B 2260/421* (2013.01)

(58) Field of Classification Search
CPC .... F03D 3/005; F03D 9/12; F05B 2220/7068; F05B 2240/211; F05B 2250/131; F05B 2260/421
USPC ..................... 290/44, 55; 310/74, 75 R, 153
See application file for complete search history.

(56) References Cited

U.S. PATENT DOCUMENTS

| | | | |
|---|---|---|---|
| 2,768,316 A * | 10/1956 | Neiss | H02K 49/108 310/95 |
| 4,379,598 A * | 4/1983 | Goldowsky | F16C 32/0429 310/90.5 |
| 4,578,610 A | 3/1986 | Kliman et al. | |

(Continued)

FOREIGN PATENT DOCUMENTS

| CN | 1929243 | 3/2007 |
|---|---|---|
| CN | 103758707 | 4/2014 |

(Continued)

*Primary Examiner* — Pedro J Cuevas
(74) *Attorney, Agent, or Firm* — Kyle R Satterthwaite; Michael R Williams; Ade & Company Inc.

(57) ABSTRACT

A rotor for a vertical axis wind turbine generator features a flywheel having first and second faces located opposite one another across a thickness of the flywheel, and a circumferential perimeter edge joining the first and second faces together around the central axis at a perimeter of the flywheel. A series of cavities are spaced radially inward from the circumferential perimeter edge and open into the flywheel from the first face on a path disposed circumferentially about the central axis. A series of permanent magnets carried in the cavities have the opposing poles of adjacent magnets facing in the same axial direction. The recessed magnet configuration avoids the separate magnet-retention means required for flush-mount configurations, and increases the performance of the generator.

22 Claims, 3 Drawing Sheets

(56) References Cited

U.S. PATENT DOCUMENTS

| | | | | |
|---|---|---|---|---|
| 4,916,346 A * | 4/1990 | Kliman | | H02K 1/246 |
| | | | | 310/156.51 |
| 5,397,953 A * | 3/1995 | Cho | | H02K 1/02 |
| | | | | 310/156.35 |
| 5,590,568 A * | 1/1997 | Takara | | F16F 15/30 |
| | | | | 74/572.1 |
| 5,713,405 A * | 2/1998 | Kashiwagi | | B23Q 1/5468 |
| | | | | 192/84.3 |
| 5,714,941 A * | 2/1998 | Gandre | | F16F 15/035 |
| | | | | 324/163 |
| 5,982,058 A * | 11/1999 | Bustamante | | H02K 37/24 |
| | | | | 310/156.37 |
| 6,445,105 B1 | 9/2002 | Kliman | | H02K 1/14 |
| | | | | 310/156.35 |
| 6,710,489 B1 | 3/2004 | Gabrys | | |
| 6,803,694 B2 * | 10/2004 | Decristofaro | | B82Y 25/00 |
| | | | | 310/156.32 |
| 6,858,958 B2 * | 2/2005 | Schrotter | | H02K 49/108 |
| | | | | 310/103 |
| 6,969,937 B1 * | 11/2005 | Schuering | | H02K 1/2766 |
| | | | | 310/156.01 |
| 6,995,494 B2 * | 2/2006 | Haugan | | H02K 21/24 |
| | | | | 310/156.32 |
| 7,105,975 B2 * | 9/2006 | Semones | | H02K 21/24 |
| | | | | 310/216.008 |
| 7,109,629 B2 * | 9/2006 | Al-Khayat | | H02K 1/2793 |
| | | | | 310/261.1 |
| 7,144,468 B2 * | 12/2006 | Decristofaro | | H02K 1/02 |
| | | | | 156/185 |
| 7,145,276 B2 * | 12/2006 | Wise | | H02K 7/025 |
| | | | | 310/103 |
| 7,221,073 B2 * | 5/2007 | Yamada | | H02K 21/24 |
| | | | | 310/216.105 |
| 7,579,744 B2 * | 8/2009 | Kato | | H02K 1/2793 |
| | | | | 310/156.28 |
| 7,629,724 B2 * | 12/2009 | Tanno | | H02K 21/24 |
| | | | | 310/156.13 |
| 8,680,736 B2 * | 3/2014 | Wang | | H02K 21/24 |
| | | | | 310/216.045 |
| 9,106,113 B2 * | 8/2015 | Ireland | | H02K 21/24 |
| 9,388,795 B1 * | 7/2016 | Choi | | F03D 80/70 |
| 9,797,383 B1 * | 10/2017 | Choi | | F03D 9/25 |
| 10,340,753 B2 * | 7/2019 | Rhyu | | H02K 1/02 |
| 10,355,541 B2 * | 7/2019 | Tsai | | H02K 1/148 |
| 10,886,796 B2 * | 1/2021 | Stetina | | H02K 3/50 |
| 2004/0150279 A1 * | 8/2004 | Wise | | H02K 7/025 |
| | | | | 310/103 |
| 2004/0207286 A1 | 10/2004 | Bales et al. | | |
| 2008/0122308 A1 * | 5/2008 | Mleux | | F16C 32/0436 |
| | | | | 310/90.5 |
| 2008/0174119 A1 | 7/2008 | Hu | | |
| 2009/0200883 A1 | 8/2009 | Halstead et al. | | |
| 2009/0322095 A1 | 12/2009 | Mazur | | |
| 2010/0019589 A1 * | 1/2010 | Saban | | H02K 5/1285 |
| | | | | 310/52 |
| 2010/0148516 A1 * | 6/2010 | Buhtz | | F03D 9/12 |
| | | | | 290/55 |
| 2013/0009406 A1 * | 1/2013 | Ireland | | F03D 9/25 |
| | | | | 290/55 |

FOREIGN PATENT DOCUMENTS

| | | |
|---|---|---|
| JP | 2008082251 | 4/2008 |
| KR | 20140110287 | 9/2014 |
| WO | 2008153423 | 12/2008 |

* cited by examiner

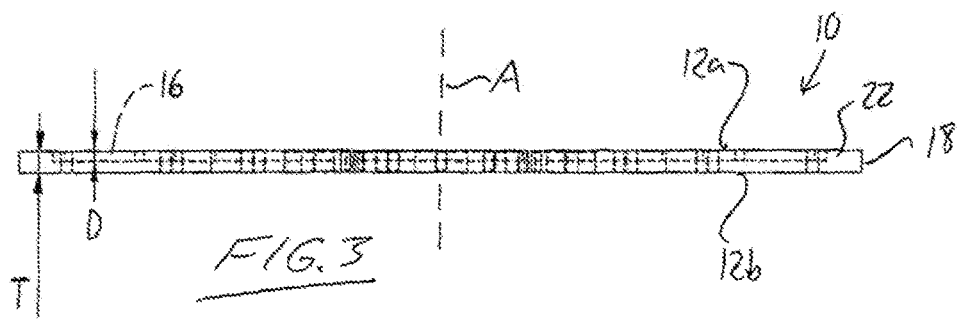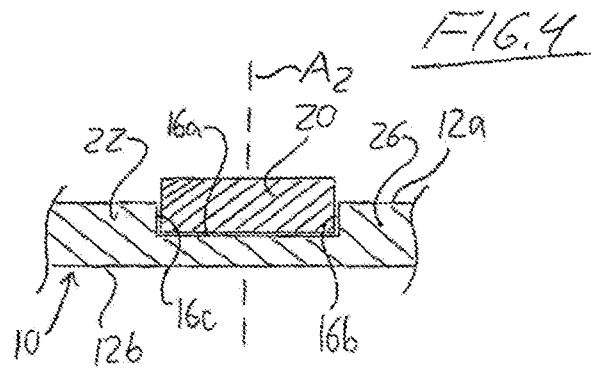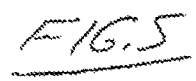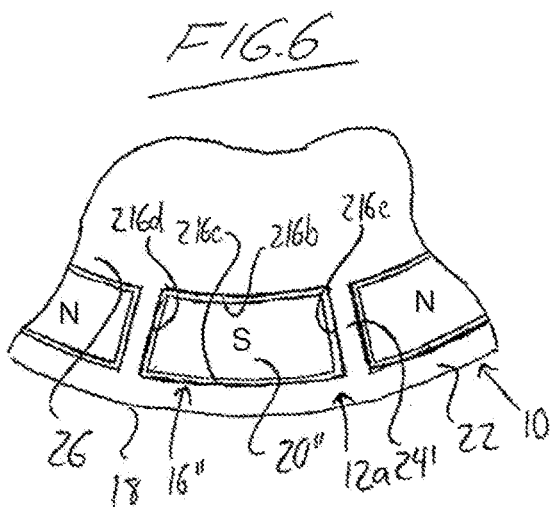

RECESSED-MAGNET FLYWHEEL CONSTRUCTION FOR VERTICAL AXIS WIND TURBINES

CROSS-REFERENCE TO RELATED APPLICATIONS

This application claims is a continuation of International PCT Application No. PCT/CA2016/051357, filed Nov. 21, 2016, the entirety of which is incorporated herein by reference.

FIELD OF THE INVENTION

The present invention relates generally to wind turbines, and more particularly to axial-flux generators of vertical axis wind turbines in which permanent magnets are recessed into the rotor of the generator.

BACKGROUND OF THE INVENTION

It is well known for a vertical axis wind turbine (VAWT) to employ an axial-flux generator in which a series of permanent magnets circumferentially disposed around the central rotational axis of the rotor flywheel are situated with their poles facing axially toward a stator whose coils are likewise disposed around the same axis. The stator-facing poles of the permanent magnets alternate between North and South moving sequentially from one magnet to the next around the central axis. The rotor is driven for rotation about the central axis under the effect of wind currents acting on blades or foils coupled to the rotor, and the movement of the alternating stator-facing magnetic poles past the coils in close axial proximity thereto generates current in the coils.

An example of such a VAWT generator is disclosed in PCT Application Publication No. WO2011/113143, the entirely of which is incorporated herein by reference. This reference employs a surface-mounted configuration of the magnets on the rotor flywheel, in which the permanent magnets are bonded to a flat face of the flywheel using a suitable adhesive.

However, a potential risk with adhesive surface mounting is that the adhesive bond will not hold up against centrifugal forces acting radially outward during rotation of the flywheel, introducing the risk of the magnets shearing off the face of the flywheel and being ejected outward from the perimeter edge thereof.

One prior solution to better secure the permanent magnets in place is shown in U.S. Patent Application Publication No. US2010/0194251 in which a rotor plate of magnetically attractive material provides a base to which the permanent magnets are magnetically secured, and a separate magnet index ring with cutouts of magnet conforming shape is adhesively secured to the rotor base plate to positively position the magnets according to the layout of the cutouts and to block shifting of the magnets along the face of the rotor base plate.

However, such a solution increases the number of separate components in the rotor assembly by relying on a dedicated piece to retain the magnets in place. While reliance on the index or retaining ring to determine the proper magnet positions eliminates the need to position with magnets with a suitable jig during production, the ring itself must be carefully installed and precisely located in order to ensure the proper final magnet positions.

Accordingly, there remains room for improved or alternate magnet-mounting solutions for VAWT generators.

Other references disclosing mounting of permanent magnets on rotors of various rotational machines and devices include the following EP1014542, JP2005094955, JP2007104820, U.S. Pat. Nos. 3,762,042, 4,318,019, 5,982,070, 6,798,103, 6,891,295, 6,952,058, 7,145,276, 7,279,819, 7,973,443, US2005/0127767, US2007/0247017, US2010/0148516, US2010/0187934, US2012/0286520, and US2013/0090203.

SUMMARY OF THE INVENTION

According to a first aspect of the invention there is provided a rotor for a vertical axis wind turbine, the rotor comprising:

a flywheel having first and second faces located opposite one another across a thickness of the flywheel so as to face opposite directions along a central axis passing through said first and second faces, and a circumferential perimeter edge joining the first and second faces together around the central axis at a perimeter of flywheel; and a series of cavities spaced radially inward from the circumferential perimeter edge and opening into the flywheel from the first face thereof on a path disposed circumferentially about the central axis to carry a series of permanent magnets in the series of cavities with poles of said magnets facing in an axial direction along the central axis.

According to a second aspect of the invention there is provided a rotor for a vertical axis wind turbine, the rotor comprising:

a flywheel having first and second faces located opposite one another across a thickness of the flywheel so as to face opposite directions along a central axis passing through said first and second faces, and a circumferential perimeter edge joining the first and second faces together around the central axis at a perimeter of flywheel; and a series of cavities spaced radially inward from the circumferential perimeter edge and opening into the flywheel from the first face thereof on a path disposed circumferentially about the central axis; and a series of permanent magnets each seated within a respective one of the series of cavities with poles of said magnets facing in an axial direction along the central axis.

In one embodiment, the series of permanent magnets are arranged in adjacent pairs around the central axis with a north pole of one magnet in each pair and a south pole of another magnet in said each pair facing a same axial direction along the central axis as the first face of the flywheel.

Preferably the magnets are positioned within the cavities in partially recessed positions reaching outwardly beyond the first face of the rotor from within the cavities.

Preferably the magnets have a thickness exceeding a depth of the cavities and the magnets reach axially outward of the cavities past the first face of the flywheel.

Preferably each cavity receives only a single magnet therein.

Preferably each magnet is adhesively secured in the respective cavity.

Preferably each cavity contains only part or all of the respective magnet and adhesive securing said respective magnet in place in the cavity.

Each magnet may have a trapezoidal shape in planes normal the central axis, with a shorter one of two parallel sides of the trapezoidal shape of said each magnet located nearer to the central axis than an opposing longer one of said two parallel sides of the trapezoidal shape of said each magnet.

In such instance, each cavity preferably has a trapezoidal shape in planes normal the central axis, with a shorter one of two parallel sides of the trapezoidal shape of said each cavity located nearer to the central axis than an opposing longer one of said two parallel sides of the trapezoidal shape of said each cavity.

Alternatively, each magnet may have an arcuate shape in planes normal the central axis, with a shorter one of two concentrically arcuate edges of the arcuate shape located nearer to the central axis than an opposing longer one of said concentrically arcuate edges of the trapezoidal shape.

In such instance, each cavity preferably has an arcuate shape in planes normal the central axis, with a shorter one of two concentrically arcuate edges of the arcuate shape of said each cavity located nearer to the central axis than an opposing longer one of said two concentrically arcuate edges of the arcuate shape of said each cavity.

Preferably the cavities are pocket-shaped cavities recessed into the flywheel from the first face thereof and terminating short of the second face for seating of the magnets against bottom surfaces of the pocket-shaped cavities disposed intermediately between the first and second faces of the flywheel.

Preferably the thickness of the flywheel is at a maximum at the circumferential perimeter edge thereof to define a full-thickness circumferential region of the flywheel between the series of cavities and the circumferential perimeter edge.

Preferably the series of cavities are separated from one another around the central axis by intact regions of the flywheel spanning from the first face to the second space at locations between the cavities.

Preferably the flywheel is a single unitary body that seamlessly and integrally defines the first and second faces and all boundary walls of the cavities opening into the first face of the flywheel.

Preferably the unitary body is magnetically attractable.

Preferably the flywheel is steel.

According to a third aspect of the invention there is provided a vertical axis wind turbine comprising:

a stator comprising coils carried thereon to reside around a vertical rotational axis of the wind turbine;

a rotor according to the first or second aspect of the invention, which is rotatably supported with its central axis coincide with the vertical rotational for rotation of the rotor therearound and with the first face of the rotor facing toward the stator in close proximity thereto to position the north and south poles of the magnets near the coils of the stator; and wind engagement members coupled to the rotor in a manner arranged to drive rotation of the rotor about the coincident axes under action of wind current on the wind engagement members, whereby movement of the poles of the magnets past the coils induces current therein.

According to a fourth aspect of the invention there is provided a method of producing a rotor for a vertical axis wind turbine, the method comprising:

in a flywheel having opposing first and second faces and a circumferential perimeter edge, machining cavities into the flywheel from the first face thereof at locations inwardly from the circumferential perimeter edge thereof for receipt of a respective magnet into each pocket-shaped cavity in an installed position in which outwardly radial movement of the magnet toward the perimeter edge of the flywheel under rotation of the flywheel is blocked by a perimeter of the cavity.

Preferably the flywheel has a unitary body construction of a magnetically attractable material composition that integrally and seamlessly defines the opposing first and second faces and the circumferential perimeter edge of the flywheel, an wherein the step of machining the cavities comprises machining pocket-shaped cavities that terminate short of the opposing second face to create a seat in each cavity at a plane disposed intermediately between the opposing faces of the flywheel for placement of a respective magnet into the pocket-shaped cavity in a seated position with one pole of said magnet facing said seat and an opposing pole of said magnet facing a same direction of the first face of the flywheel.

BRIEF DESCRIPTION OF THE DRAWINGS

In the accompanying drawings, which illustrate one or more exemplary embodiments of the present invention:

FIG. 3 is an edge-on view of the rotor flywheel of FIG. 1.

FIG. 4 is partial cross-sectional view of an assembled rotor as taken along line IV-IV of the rotor flywheel of FIG. 2, illustrating seating of one magnet of the assembled rotor in a partially recessed position in a machined pocket of the flywheel.

FIG. 5 is partial plan view of another assembled rotor, which differs from that in FIG. 4 only in that the recessed pockets and the magnets seated therein are trapezoidal, rather than rectangular, in shape.

FIG. 6 is partial plan view of yet another assembled rotor, which differs from those of FIGS. 4 and 5 only in that the recessed pockets and the magnets seated therein are arc-shaped.

DETAILED DESCRIPTION

Figure 1:
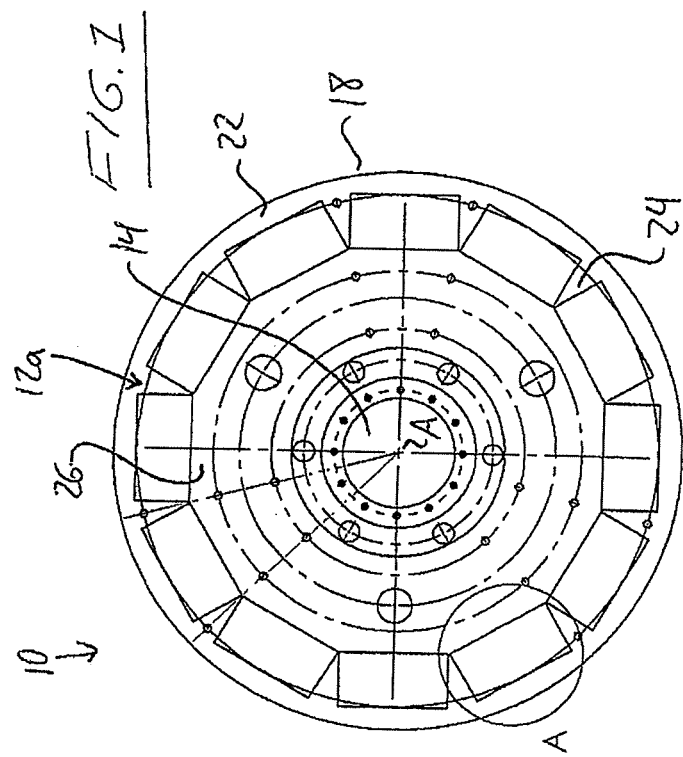
FIG. 1 is an overhead plan view of a rotor flywheel for an axial flux generator of a vertical axis wind turbine, with recessed pockets in a face of the flywheel for mounting of magnets within the same.

FIG. 1 shows a flywheel 10 for a rotor of an axial flux generator for a vertical axis wind turbine. The figure shows a plan view of the rotor from a first face 12a thereof that faces toward the stator of the generator during use. In a conventional manner, the flywheel 10 is of a plate-shaped annular form of circular inner and outer peripheries, whereby a central opening 14 passing axially through the flywheel accommodates receipt of a vertically standing spindle therethrough for rotatable support of the flywheel on the spindle by a suitable bearing (not shown). In a known manner, the flywheel is thus configured with suitable mounting features around the central opening therein for mounting of a bearing on the flywheel to enable relative rotation between the flywheel and the spindle (not shown).

As known in the art, the flywheel may have its first face oriented upward or downward toward the stator, depending on whether the rotor in question is mounted over or beneath the stator. A flywheel of the described type may be employed for one or both rotors in a two-rotor generator in which a pair of rotors are respectively disposed above and below the stator. Likewise, a flywheel rotor of the present invention may be employed in a wind turbine having multiple stators and rotors. The aforementioned PCT application incorporated herein may be referred to for further details of the relative positioning of the rotors and stator and possible mounting solutions for same, although other mounting solutions known in the art may likewise be employed.

Where the flywheel differs from conventional design is in the presence of a series of pocket-shaped cavities 16 machined into the flywheel at the first face 12*a* thereof to a depth reaching partially, and not fully, through the axial thickness of the flywheel. Each cavity 16 is thus recessed in the flywheel from the first face 12*a* thereof to extending toward, without reaching, the opposing parallel face 12*b* of the flywheel, which faces away from the stator in the final generator assembly. In the first embodiment, the cross-sectional shape of each recess in planes normal to the central axis A is rectangular, although other options are also contemplated, for example as exemplified by other embodiments referenced herein further below. Each rectangular cavity has a depth D measured parallel to the central rotational axis A of the flywheel, a width W measured radially of the central axis A, and a length L measured tangentially of the central axis A at a radius that bisects the cavity at the mid-point of this length.

The pocket-shaped cavities are arranged on a circular path around the central axis A at a radial distance outward therefrom, but inward from the circumferential perimeter edge 18 that joins the two faces of the flywheel together around the outer periphery thereof. A thickness T of the flywheel is measured between the two faces of the flywheel in a direction parallel to the central axis A at this circumferential perimeter edge 18. The identically sized and shaped rectangular pockets or cavities 16 of the first embodiment each closely conform in cross-sectional size to a permanent magnet 20 that is to be respectively received in the pocket 16 during assembly of the rotor of the VAWT generator. Accordingly, mere placement of each magnet into the respective pocket 16 acts to positively position this magnet in its appropriate position so that the series of magnets occupying the series of pockets are evenly distributed around the central axis at the same radial distance therefrom.

A flat bottom 16*a* of each pocket 16 lies in a plane parallel to the two faces of the flywheel 10 at an intermediate location between these faces along the axial or thickness direction of the flywheel. The four side walls 16*b*, 16*c*, 16*d*, 16*e* of each pocket may each be perpendicular to the plane of the flat bottom thereof so that the pocket boundaries defined by the four side walls and closed bottom of the pocket cooperate with the imaginary boundary defined by the plane of the flywheel's first face 12*a* o delimit a volume of rectangular cuboid form. As shown in FIG. 3, the depth D of the pockets may be equal, or approximately equal, to half of the overall thickness T of the flywheel 10.

Figure 2:
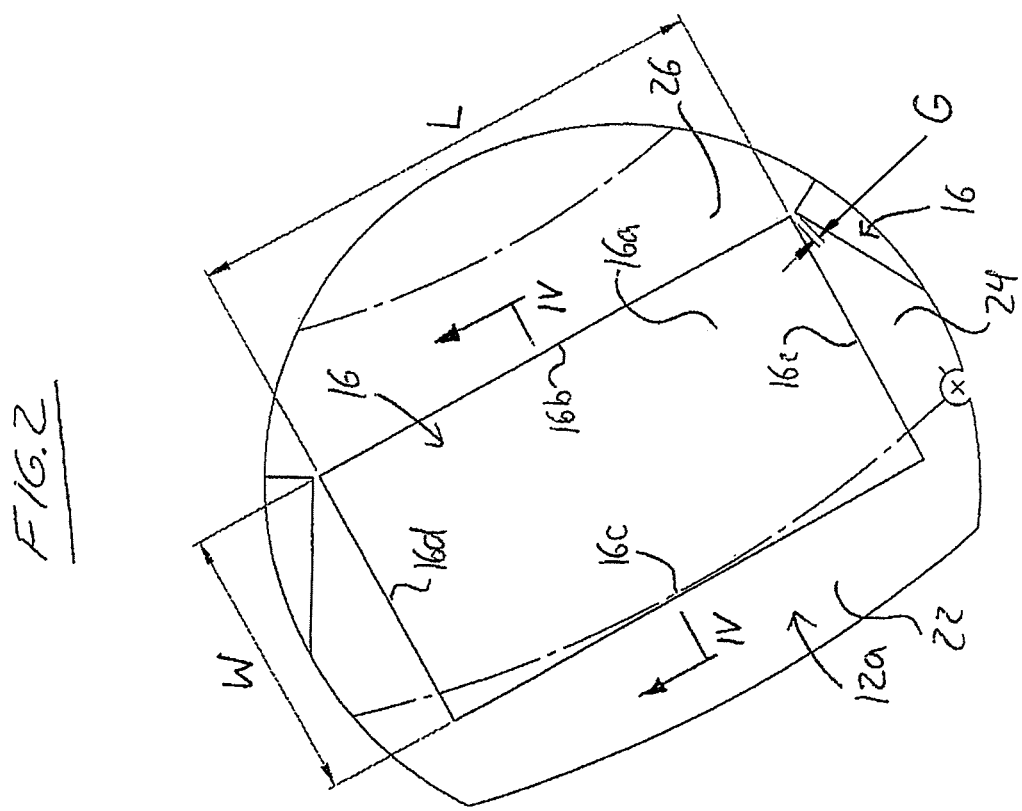
FIG. 2 is a partial closeup view of the rotor flywheel of FIG. 1 as marked at detail circle A thereof.

From the circumferential perimeter edge 18 of the flywheel to the radially outermost one of the two tangential side walls 16*c* of each pocket, a circumferential edge-adjacent region 22 of the flywheel 10 is intact over the full overall thickness T of the flywheel around the full outer circumference thereof. This intact full-thickness region 22 presents a barrier to radially outward shifting of the magnet in each pocket by centrifugal forces during rotation of the flywheel in the final VAWT assembly. As best shown in FIG. 2, the full flywheel thickness is also left intact between each adjacent pair of pockets in the series so that this intact full-thickness inter-pocket region 24 between each neighbouring pair of pockets forms a physical separation or barrier between the two pockets. Likewise, another full-thickness region 26 of the flywheel is left intact at the radially innermost one 16*b* of the two tangential side walls of each pocket, spanning radially inward therefrom toward the bearing-supporting area of the flywheel around the central opening 14 therein.

Accordingly, each and every pocket machined into the flywheel is fully surrounded on all sides by intact full-thickness areas of the flywheel. The flywheel, is formed by a single unitary body of magnetically attractable material that seamlessly and integrally defines the two opposing flywheel faces of circular perimeter, the circumferential perimeter edge joining the faces together, and the walls and bottom of each recessed pocket-shaped cavity. The flywheel, for example, may be machined from a piece of ferromagnetic steel stock of uniform material composition, for example a mild or soft steel such as W44. By machining magnet-accommodating pockets into a single-piece flywheel, the number of pieces to the overall rotor construction is reduced compared to use of a retaining ring or other separate component to define a barrier for blocking centrifugal or other displacement of the magnets during driven rotation of the rotor by wind currents acting on wind engagement surfaces of blades or vanes coupled to the rotor. Different vane or blade designs defining suitable wind engagement members are known in the art, as are suitable solutions for coupling the same to the rotor in manner driving rotation of the same so as to operate the generator under the action of the wind. Accordingly, further details of such components are omitted herein.

With reference to FIG. 4, to assemble the rotor, a respective magnet 20 is lowered into each pocket 16 from the open end thereof at the first face 12*a* of the flywheel 10. In a conventional manner, an even number of magnets may be used and may be oriented such that for each pair of adjacent magnets around the flywheel, opposite poles of the two magnets in the pair face outwardly away from the first face 12*a* of the flywheel in the axial direction. That is, the poles of the magnets alternate around the flywheel axis A so that the north pole of one magnet in each adjacent pair and a south pole of the other magnet in this same pair face a same common direction along the central axis as the first face of the flywheel. The axial direction faced by the poles of each magnet is schematically illustrated by magnet axis $A_2$ in FIG. 4, which can be seen to be parallel to the central axis A of the flywheel 10. The alternating poles of the magnets are schematically illustrated in FIG. 5, where N denotes a magnet's north pole, and S denotes the adjacent magnet's south pole.

In the illustrated embodiments, the thickness of the magnet 20 (measured parallel to the flywheel thickness T) exceeds the depth D of the pocket 16. As a result, insertion of the magnet into a seated position resting atop the flat bottom 16*a* of the pocket 16 leaves a portion of the magnet outside the pocket, so as to reach axially beyond the first face 12*a* of the flywheel, and onward toward the stator of the VAWT generator once fully assembled. The magnets of the illustrated embodiments are thus partially recessed within the flywheel, as opposing to being fully recessed therein. In other embodiments, the magnets may be fully recessed to a level flush with, or recessed slightly from, the first face 12*a* of the flywheel.

In addition to the magnetic attraction between the permanent magnet 20 and the ferromagnetic flywheel body, the magnet may be adhesively secured in place in the respective pocket, for example at least at the face-to-face interface between the underside of the magnet and the flat bottom 16*a* of the pocket.

Testing of prototypes of the invention has revealed that the partially recessed magnet will exert greater magnetic forces in the axial direction on the stator-facing side 12a of the flywheel than are provided by use of the same magnet in a conventional surface-mounted application. Accordingly, not only does the pocket-featuring flywheel reduce the number of components in the final generator by avoiding a separate magnet-retention ring or the like, but the recessed magnets also improve the performance of the generator. In addition, manual labour in assembling the generator can be reduced compared to prior art solutions in which a retention ring was manually placed and adhered, as the magnet-retaining pockets of the present invention can be implemented on an automated basis, for example as part of a CNC machining process used to form other machined features of the flywheel, such suitable attachment points for the central bearing that carries the finished rotor on the spindle of the VAWT generator.

While the first embodiment employs rectangular pockets and magnets, other embodiments may employ alternate shapes. With reference to FIG. 2, the use of rectangular pockets and magnets results a non-uniform gap G between each adjacent pair of pockets, and thus between each adjacent pair of similarly shaped magnets. That is, the pockets, and thus the conformingly shaped magnets received therein, are closest together at the radially innermost sides 16b of the pockets 16, and grow further apart moving radially outward toward the circumferential perimeter edge 18 of the flywheel. As a result, the gap between the pockets/magnets at the radially outermost sides 16c of the pockets is notably greater than at the innermost sides 16b.

FIG. 5 illustrates the use of trapezoidally shaped recesses 16' and trapezoidally shaped magnets 20' to leave an inter-pocket flywheel region 24' of uniform width so as to provide a uniform gap size between the magnets in the circumferential direction around the central axis A. The shorter one 116b of the two parallel tangentially-oriented sides 116b, 116c of the trapezoidal pocket 116' lies nearer the central axis A than the opposing one 116c of these sides that lies nearer the circumferential perimeter edge 18 of the flywheel. Each one of the two non-parallel non-tangential sides 116d, 116e of the trapezoidal pocket 16' lies parallel to a matching side of the next pocket, each of which lie parallel to a radius of the flywheel that bisects the uniform gap between these two pockets. The sides of the trapezoidal magnets are related to one another in the same manner as the sides of the pockets of matching shape. FIG. 6 illustrates use of arcuately shaped recesses 16" and arcuately shaped magnets 20" to likewise leave an inter-pocket flywheel region 24' of uniform width so as to provide a uniform gap size between the magnets in the circumferential direction around the central axis A. Each pocket, and each correspondingly shaped magnet, has two opposing arcuate sides 216b, 216c concentrically curving about the central axis A, and two opposite linear sides 216d, 216e that join the arcuate sides together at the respective ends thereof. The shorter one 216b of the two concentric arcuate sides of the pocket lies nearer the central axis A than the opposing one 216c of these edges that lies nearer the circumferential perimeter edge 18 of the flywheel. Each one of the two linear sides of the arcuate pocket 16' lies parallel to a matching side of the next pocket, each of which lie parallel to a radius of the flywheel that bisects the uniform gap between these two pockets. The sides of the arc-shaped magnets are related to one another in the same manner as the sides of the pockets of matching shape.

Figure 7:
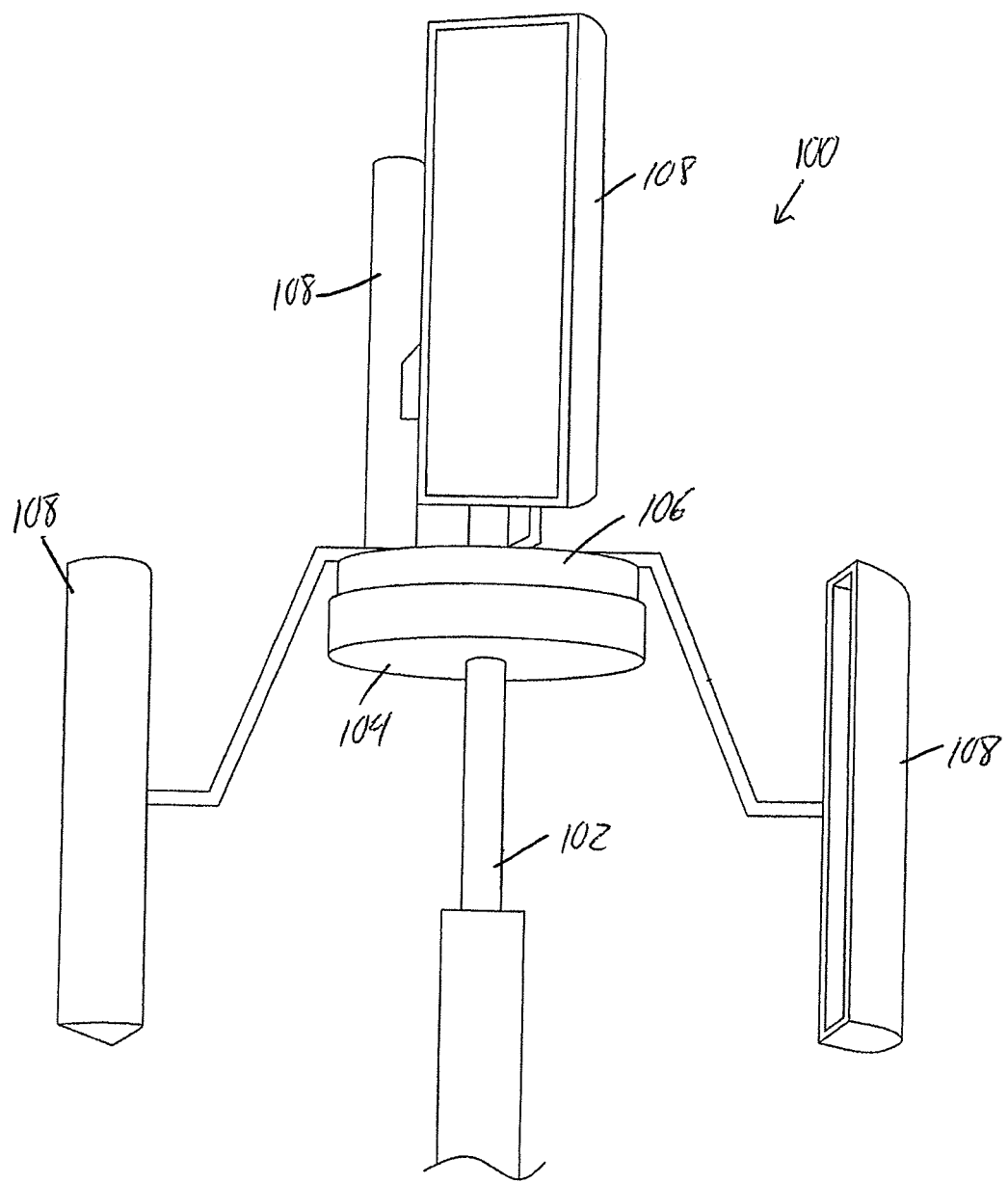
FIG. 7 is a schematic perspective elevational view of a vertical axis wind turbine that may employ the inventive rotor flywheel of the present invention.

FIG. 7 illustrates an example of a vertical axis wind turbine 100 which may employ the forgoing rotor structure in its generator. The wind turbine 100 features a vertically upright central pole 102, to which a stator 104 is attached or affixed in a stationary position centered on the axis of the pole 102. A rotor 106 of the type disclosed herein above is carried on the pole in a position centered on the axis thereof and rotatable about said axis, with the first side of the rotor facing toward the stator to place the recessed magnets in close proximity to the coils of the stator. A plurality of blades 108 are coupled to the rotor 104 to engage the wind and thereby provide a drive source in the rotor, rotation of which induces current in the stator. It will be appreciate that various VAWT designs employing this same general configuration of parts may likewise exploit the benefits of the inventive rotor of the present invention.

While the illustrated embodiment has an even number of magnets arranged around the central axis with their poles alternating from one to the next (i.e. with the north pole of one magnet facing the same axial direction as the south pole of the next magnet), it will be appreciate that other embodiments may depart from such a configuration and instead have the magnets all facing a common direction.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A rotor for a vertical axis wind turbine, the rotor comprising:
    a flywheel having first and second faces located opposite one another across a thickness of the flywheel so as to face opposite directions along a central axis passing through said first and second faces, and a circumferential perimeter edge joining the first and second faces together around the central axis at a perimeter of flywheel; and
    a series of cavities spaced radially inward from the circumferential perimeter edge and opening into the flywheel from the first face thereof on a path disposed circumferentially about the central axis to carry a series of permanent magnets in the series of cavities with poles of said magnets facing in an axial direction along the central axis;
    wherein the cavities are pocket-shaped cavities recessed into the flywheel from the first face thereof and terminating short of the second face for seating of the magnets against bottom surfaces of the pocket-shaped cavities disposed intermediately between the first and second faces of the flywheel.

2. The rotor of claim 1 further comprising said series of permanent magnets, each of which is seated within a respective one of the series of cavities with the poles of said magnets facing in said axial direction along the central axis.

3. The rotor of claim 2 wherein the series of permanent magnets are arranged in adjacent pairs around the central axis with a north pole of one magnet in each pair and a south pole of another magnet in said each pair facing a same axial direction along the central axis as the first face of the flywheel.

4. The rotor of claim 2 wherein the magnets are positioned within the cavities in partially recessed positions reaching outwardly beyond the first face of the rotor from within the cavities.

5. The rotor of claim 2 wherein the magnets have a thickness exceeding a depth of the cavities and the magnets reach axially outward of the cavities past the first face of the flywheel.

6. The rotor of claim 2 wherein each cavity receives only a single magnet therein.

7. The rotor of claim 2 wherein each magnet is adhesively secured in the respective cavity.

8. The rotor of claim 7 wherein each cavity contains only part or all of the respective magnet and adhesive securing said respective magnet in place in the cavity.

9. The rotor of claim 2 wherein each magnet has a trapezoidal shape in planes normal the central axis, with a shorter one of two parallel sides of the trapezoidal shape of said each magnet located nearer to the central axis than an opposing longer one of said two parallel sides of the trapezoidal shape of said each magnet.

10. The rotor of claim 2 wherein each magnet has an arcuate shape in planes normal the central axis, with a shorter one of two concentrically arcuate edges of the arcuate shape located nearer to the central axis than an opposing longer one of said concentrically arcuate edges of the arcuate shape.

11. A vertical axis wind turbine comprising:
a stator comprising coils carried thereon to reside around a vertical rotational axis of the wind turbine;
the rotor of claim 2 rotatably supported with its central axis coincide with the vertical rotational for rotation of the rotor therearound and with the first face of the rotor facing toward the stator in close proximity thereto to position the north and south poles of the magnets near the coils of the stator; and
wind engagement members coupled to the rotor in a manner arranged to drive rotation of the rotor about the coincident axes under action of wind current on the wind engagement members, whereby movement of the poles of the magnets past the coils induces current therein.

12. The rotor of claim 1 wherein each cavity has a trapezoidal shape in planes normal the central axis, with a shorter one of two parallel sides of the trapezoidal shape of said each cavity located nearer to the central axis than an opposing longer one of said two parallel sides of the trapezoidal shape of said each cavity.

13. The rotor of claim 1 wherein each cavity has an arcuate shape in planes normal the central axis, with a shorter one of two concentrically arcuate edges of the arcuate shape of said each cavity located nearer to the central axis than an opposing longer one of said two concentrically arcuate edges of the arcuate shape of said each cavity.

14. The rotor of claim 1 wherein the series of cavities are separated from one another around the central axis by intact regions of the flywheel spanning from the first face to the second space at locations between the cavities.

15. The rotor of claim 1 wherein the flywheel is a single unitary body that seamlessly and integrally defines the first and second faces and all boundary walls of the cavities opening into the first face of the flywheel.

16. The rotor of claim 15 wherein the unitary body is magnetically attractable.

17. The rotor of claim 15 wherein the flywheel is steel.

18. A rotor for a vertical axis wind turbine, the rotor comprising:
a flywheel having first and second faces located opposite one another across a thickness of the flywheel so as to face opposite directions along a central axis passing through said first and second faces, and a circumferential perimeter edge joining the first and second faces together around the central axis at a perimeter of flywheel; and
a series of cavities spaced radially inward from the circumferential perimeter edge and opening into the flywheel from the first face thereof on a path disposed circumferentially about the central axis to carry a series of permanent magnets in the series of cavities with poles of said magnets facing in an axial direction along the central axis;
wherein the thickness of the flywheel is at a maximum at the circumferential perimeter edge thereof to define a full-thickness circumferential region of the flywheel between the series of cavities and the circumferential perimeter edge.

19. The rotor of claim 18 wherein the cavities are pocket-shaped cavities recessed into the flywheel from the first face thereof and terminating short of the second face for seating of the magnets against bottom surfaces of the pocket-shaped cavities disposed intermediately between the first and second faces of the flywheel.

20. A method of producing a rotor for a vertical axis wind turbine, the method comprising:
in a flywheel having opposing first and second faces and a circumferential perimeter edge, machining cavities into the flywheel from the first face thereof at locations inwardly from the circumferential perimeter edge thereof for receipt of a respective magnet into each pocket-shaped cavity in an installed position in which outwardly radial movement of the magnet toward the perimeter edge of the flywheel under rotation of the flywheel is blocked by a perimeter of the cavity.

21. The method of claim 20 wherein the flywheel has a unitary body construction of a material composition that integrally and seamlessly defines the opposing first and second faces and the circumferential perimeter edge of the flywheel, an wherein the step of machining the cavities comprises machining pocket-shaped cavities that terminate short of the opposing second face to create a seat in each cavity at a plane disposed intermediately between the opposing faces of the flywheel for placement of a respective magnet into the pocket-shaped cavity in a seated position with one pole of said magnet facing said seat and an opposing pole of said magnet facing a same direction of the first face of the flywheel.

22. The method of claim 20 further comprising adhesively securing each magnet in place within the respective cavity.

* * * * *